United States Patent [19]

St. Clair

[11] Patent Number: 5,500,481
[45] Date of Patent: Mar. 19, 1996

[54] COMPOSITIONS CONTAINING EPOXIDIZED MONOHYDROXYLATED DIENE POLYMERS, AMINO RESINS, AND REACTIVE REINFORCEMENT AGENTS

[75] Inventor: David J. St. Clair, Houston, Tex.

[73] Assignee: Shell Oil Company, Houston, Tex.

[21] Appl. No.: 444,080

[22] Filed: May 17, 1995

[51] Int. Cl.$^6$ .......................... C08L 53/00; C08L 53/02; C08L 61/28; C08L 61/24
[52] U.S. Cl. ...................... 525/92 K; 525/92 M
[58] Field of Search ................ 525/92 K, 92 M

[56] References Cited

U.S. PATENT DOCUMENTS

| | | | |
|---|---|---|---|
| 4,237,245 | 12/1980 | Halasa et al. | 525/272 |
| 5,115,019 | 5/1992 | Marx et al. | 525/065 |
| 5,149,895 | 9/1992 | Coolbaugh et al. | 526/173 |
| 5,169,910 | 12/1992 | Corley | 525/481 |
| 5,191,024 | 3/1993 | Shibata et al. | 525/314 |
| 5,210,359 | 5/1993 | Coolbaugh et al. | 526/173 |
| 5,229,464 | 7/1993 | Erickson et al. | 525/314 |
| 5,247,026 | 9/1993 | Erickson et al. | 525/331.9 |
| 5,332,783 | 7/1994 | Dillman et al. | 525/092 |

FOREIGN PATENT DOCUMENTS

| | | |
|---|---|---|
| 0396780A1 | 11/1989 | European Pat. Off. . |
| 0441485A2 | 1/1991 | European Pat. Off. . |
| 62-178718 | 7/1987 | Japan . |
| 02-275256 | 10/1990 | Japan . |
| 02-409745 | 12/1990 | Japan . |

OTHER PUBLICATIONS

"Vinyl Ethers: Versatile Monomers for Coatings Applications," W. J. Burlant, J. S. Plotkin, F. J. Vara, International Specialty Products, RadTech Asia '91, Osaka, Japan, Apr. 1991.

*Primary Examiner*—Robert E. Sellers
*Attorney, Agent, or Firm*—Donald F. Haas

[57] ABSTRACT

A crosslinkable composition comprising from 30 to 90 percent by weight of an epoxidized monohydroxylated polydiene polymer which is comprised of at least two polymerizable ethenically unsaturated hydrocarbon monomers wherein at least one is a diene monomer which yields unsaturation which is suitable for epoxidation, 8 to 60 percent by weight of an amino resin crosslinking agent, and 2 to 40% by weight of a reinforcing agent. The invention also encompasses a process to make such compositions by prereacting the three components with a small portion of the crosslinking catalyst required to crosslink the composition for 0.5 to 10 hours at 60° to 120° C. The preferred polymer for use herein has the formula $$(HO)_x\text{---}A\text{---}S_z\text{---}B\text{---}(OH)_y$$

wherein A and B are polymer blocks which may be homopolymer blocks of conjugated diolefin monomers, copolymer blocks of conjugated diolefin monomers, or copolymer blocks of diolefin monomers and monoalkenyl aromatic hydrocarbon monomers, S is a vinyl aromatic hydrocarbon block, x and y are 0 or 1 and either x or y must be 1 but only one at a time can be 1, and z is 0 or 1, and contains from 0.2 to 7.0 meq of epoxy per gram of polymer.

6 Claims, No Drawings

COMPOSITIONS CONTAINING EPOXIDIZED MONOHYDROXYLATED DIENE POLYMERS, AMINO RESINS, AND REACTIVE REINFORCEMENT AGENTS

BACKGROUND OF THE INVENTION

This invention relates to novel crosslinkable compositions comprised of epoxidized monohydroxylated diene polymers, amino resins and reinforcing agents. More specifically, the invention relates to the use of particular epoxidized monohydroxylated polydiene polymers in crosslinking with amino resins to produce products which are useful in a variety of reinforced compositions for adhesives, sealants and coatings. The invention also relates to a process for making high quality compositions with these three normally incompatible components.

Hydroxy functional polydiene polymers are well known. It has been shown that formulations containing these polymers, a melamine resin, and an acid catalyst can be cured by baking under normal bake conditions. Most of these polymers are homopolymers of one diene or another. For example, monohydroxylated polybutadienes are known in the art for use in adhesive formulations. U.S. Pat. No. 4,242,468 describes solventless polyurethane coatings having improved flexibility resulting from incorporation of monohydroxylated polybutadienes. Epoxidized versions of hydroxylated polybutadienes are known as well. Low viscosity epoxidized polydiene polymers are also known, especially for use in adhesives. Such polymers are described in commonly assigned U.S. Pat. Nos. 5,229,464 and 5,247,026.

Compositions based on functional polydiene polymers cured with a crosslinking agent are usually fairly soft and, although they can be very useful in some applications, have limited adhesion. Attempts to increase hardness and adhesion by increasing crosslink density with a reinforcing agent, such as a low molecular weight diol or triol, and higher levels of crosslinking agent were unsuccessful because the reinforcers and crosslinkers are relatively polar and so are incompatible with the relatively nonpolar polydiene polymers. Incompatibility of the components leads to poor properties, such as gloss, in the cured composition or, even worse, the compositions may phase separate upon standing. This invention provides a method for making compatible compositions from these components and the novel compositions themselves.

SUMMARY OF THE INVENTION

This invention is a crosslinkable composition containing an epoxidized monohydroxylated polydiene polymer which is comprised of at least two polymerizable ethylenically unsaturated hydrocarbon monomers wherein at least one is a diene monomer which yields unsaturation suitable for epoxidation, an amino resin crosslinking agent, and a reinforcing agent which has at least two functional groups which will react with the amino resin crosslinker. The preferred epoxidized monohydroxylated polymers are block copolymers of at least two conjugated dienes, preferably isoprene and butadiene, and, optionally, a vinyl aromatic hydrocarbon wherein a hydroxyl group is attached at one end of the polymer molecule. These polymers may be hydrogenated or unhydrogenated.

In order to make the compositions of the present invention, the novel process of this invention must be followed. The polydiene polymer, the amino resin, and the reinforcing agent are mutually incompatible and therefore cannot be used as merely a physical blend. Instead, they must be partially prereacted before they are cast as a film or otherwise used instead of being used as a blend which is crosslinked after application. The components should be "cooked" in a vessel for 0.5 to 10 hours at 60° to 120° C. with a reduced amount of the catalyst which is used to crosslink the blend. Complete crosslinking of the composition is accomplished after it is applied to the substrate and baked.

DETAILED DESCRIPTION OF THE INVENTION

Polymers containing ethylenic unsaturation can be prepared by copolymerizing one or more olefins, particularly diolefins, by themselves or with one or more alkenyl aromatic hydrocarbon monomers. The copolymers may, of course, be random, tapered, block or a combination of these, as well as linear, radial or star.

The polymers containing ethylenic unsaturation or both aromatic and ethylenic unsaturation may be prepared using anionic initiators or polymerization catalysts. Such polymers may be prepared using bulk, solution or emulsion techniques. When polymerized to high molecular weight, the polymer containing at least ethylenic unsaturation will, generally, be recovered as a solid such as a crumb, a powder, a pellet or the like. When polymerized to low molecular weight, it may be recovered as a liquid such as in the present invention.

In general, when solution anionic techniques are used, copolymers of conjugated diolefins, optionally with vinyl aromatic hydrocarbons, are prepared by contacting the monomer or monomers to be polymerized simultaneously or sequentially with an anionic polymerization initiator such as group IA metals, their alkyls, amides, silanolates, napthalides, biphenyls or anthracenyl derivatives. It is preferred to use an organo alkali metal (such as sodium or potassium) compound in a suitable solvent at a temperature within the range from about −150° C. to about 300° C., preferably at a temperature within the range from about 0° C. to about 100° C. Particularly effective anionic polymerization initiators are organo lithium compounds having the general formula:

$$RLi_n$$

wherein R is an aliphatic, cycloaliphatic, aromatic or alkyl-substituted aromatic hydrocarbon radical having from 1 to about 20 carbon atoms and n is an integer of 1 to 4.

Conjugated diolefins which may be polymerized anionically include those conjugated diolefins containing from about 4 to about 24 carbon atoms such as 1,3-butadiene, isoprene, piperylene, methylpentadiene, phenyl-butadiene, 3,4-dimethyl-1,3-hexadiene, 4,5-diethyl-1,3-octadiene and the like. Isoprene and butadiene are the preferred conjugated diene monomers for use in the present invention because of their low cost and ready availability. Alkenyl (vinyl) aromatic hydrocarbons which may be copolymerized include vinyl aryl compounds such as styrene, various alkyl-substituted styrenes, alkoxy-substituted styrenes, vinyl napthalene, alkyl-substituted vinyl napthalenes and the like.

The monohydroxylated polydienes are synthesized by anionic polymerization of conjugated diene hydrocarbons with lithium initiators. This process is well known as described in U.S. Pat. Nos. 4,039,593 and Re. 27,145 which descriptions are incorporated herein by reference. Polymerization commences when a monolithium initiator polymerizes the monomers into a living polymer. Typical monolithium living polymer structures containing conjugated diene hydrocarbon monomers are:

X—A—B—Li

X—A—B—A—Li wherein B represents polymerized units of one conjugated diene hydrocarbon such as butadiene, A represents polymerized units of another conjugated diene such as isoprene, and either A or B may contain one or more vinyl aromatic compounds such as styrene, and X is the residue of a monolithium initiator such as sec-butyllithium. The hydroxyl groups are added by capping the living polymer chain end with ethylene oxide and terminating with a proton donor such as an alcohol.

The preferred monohydroxylated polydiene polymer of the present invention has the structural formula $$(HO)_x—AS_z—B—(OH)_y \qquad (I)$$

wherein A and B are polymer blocks which may be homopolymer blocks of conjugated diolefin monomers, copolymer blocks of conjugated diolefin monomers, or copolymer blocks of diolefin monomers and monoalkenyl aromatic hydrocarbon monomers. These polymers may contain up to 60% by weight of at least one vinyl aromatic hydrocarbon, preferably styrene. Generally, it is preferred that the A blocks should have a greater concentration of more highly substituted aliphatic double bonds than the B blocks have. Thus, the A blocks have a greater concentration of di-, tri-, or tetra-substituted unsaturation sites (aliphatic double bonds) per unit of block mass than do the B blocks. This produces a polymer wherein the most facile epoxidation occurs in the A blocks. The A blocks have a molecular weight of from 100 to 6000, preferably 500 to 4,000, and most preferably 1000 to 3000, and the B blocks have a molecular weight of from 1000 to 15,000, preferably 2000 to 10,000, and most preferably 3000 to 6000. S is a vinyl aromatic hydrocarbon block which may have a molecular weight of from 100 to 10,000. x and y are 0 or 1. Either x or y must be 1, but only one at a time can be 1. z is 0 or 1. Either the A or the B block may be capped with a miniblock of polymer, 50 to 1000 molecular weight, of a different composition, to compensate for any initiation, tapering due to unfavorable copolymerization rates, or capping difficulties. These polymers are epoxidized such that they contain from 0.2 to 7.0 milliequivalents (meq) of epoxy per gram of polymer.

The most highly preferred polymers for use herein are diblock polymers which fall within the scope of formula (I) above. The overall molecular weight of such diblocks may range from 1500 to 15000, preferably 3000 to 7000. Either of the blocks in the diblock may contain some randomly polymerized vinyl aromatic hydrocarbon as described above. For example, the diblocks may have the following structures:

I—B—OH   I—B/S—OH   I/S—B—OH   I—I/B—OH or

B/I—B/S—OH   B—B/S—OH   I—EB—OH   I—EB/S—OH or

I—S/EB—OH   I/S—EB—OH   HO—I—S/B   HO—I—S/EB where I represents isoprene, B represents butadiene, S represents styrene and EB represents hydrogenated butadiene, and a slash (/) represents a random copolymer block. The formula —EB/S—OH means that the hydroxyl group is attached to a styrene mer, and —S/EB—OH signifies that the hydroxyl group is attached to a hydrogenated butadiene mer. This latter case, —S/EB—OH, requires capping of the S/EB "random copolymer" block with a mini EB block to compensate for the tapering tendency of the styrene prior to capping with ethylene oxide. These diblocks are advantageous in that they exhibit lower viscosity and are easier to manufacture than the corresponding triblock polymers. It is preferred that the hydroxyl be attached to the butadiene block because the epoxidation proceeds more favorably with isoprene and there will be a separation between the functionalities on the polymer (x=0 and y=1). However, the hydroxyl may also be attached to the isoprene block if desired. This produces a more surfactant-like molecule with less load bearing capacity. The isoprene blocks may also be partially hydrogenated.

Certain triblock copolymers are also preferred for use herein. Such triblocks usually include a styrene block or randomly copolymerized styrene to increase the polymers glass transition temperature, compatibility with polar materials, strength, and room temperature viscosity. These triblocks include the following specific structures:

I—EB/S—EB—OH   I—B/S—B—OH   I—S—EB—OH   I—S—B—OH or

I—I/S—I—OH   I—S—I—OH   B—S—B—OH   B—B/S—B—OH or

I—B/S—I—OH   I—EB/S—I—OH or

I—B—S—OH   I—EB—S—OH   HO—I—EB—S

The latter group of polymers specified in the last line above wherein the styrene block is external are represented by the formula $$(HO)_x—A—B—S—(OH)_y \qquad (II)$$

where A, B, S, x, and y are as described above. These polymers and the other triblocks shown above are particularly advantageous for introducing blocks of epoxy functionality into the monohydroxylated polymers at multiple sites.

Epoxidation of the monohydroxylated base polymer can be effected by reaction with organic peracids which can be preformed or formed in situ. Suitable preformed peracids include peracetic and perbenzoic acids. In situ formation may be accomplished by using hydrogen peroxide and a low molecular weight fatty acid such as formic acid. Alternatively, hydrogen peroxide in the presence of acetic acid or acetic anhydride and a cationic exchange resin will form a peracid. The cationic exchange resin can optionally be replaced by a strong acid such as sulfuric acid or p-toluenesulfonic acid. The epoxidation reaction can be conducted directly in the polymerization cement (polymer solution in which the polymer was polymerized) or, alternatively, the polymer can be redissolved in an inert solvent. These methods are described in more detail in U.S. Pat. Nos. 5,229,464 and 5,247,026 which are herein incorporated by reference.

The molecular weights of linear polymers or unassembled linear segments of polymers such as mono-, di-, triblock, etc., or the arms of star polymers before coupling are conveniently measured by Gel Permeation Chromatography (GPC), where the GPC system has been appropriately calibrated. For anionically polymerized linear polymers, the polymer is essentially monodisperse (weight average molecular weight/number average molecular weight ratio approaches unity), and it is both convenient and adequately descriptive to report the "peak" molecular weight of the narrow molecular weight distribution observed. Usually, the peak value is between the number and the weight average. The peak molecular weight is the molecular weight of the main species shown on the chromatograph. For polydisperse polymers the weight average molecular weight should be calculated from the chromatograph and used. The materials used in the columns of the GPC are styrene-divinyl benzene gels or silica gels. The solvent is tetrahydrofuran and the detector is a refractive index detector.

If desired, these block copolymers can be partially hydrogenated. Hydrogenation may be effected selectively as disclosed in U.S. Pat. Re. No. 27,145 which is herein incorporated by reference. The hydrogenation of these polymers and copolymers may be carded out by a variety of well established processes including hydrogenation in the presence of such catalysts as Raney Nickel, nobel metals such as platinum and the like, soluble transition metal catalysts and titanium catalysts as in U.S. Pat. No. 5,039,755 which is also incorporated herein by reference. The polymers may have different diene blocks and these diene blocks may be selectively hydrogenated as described in U.S. Pat. No. 5,229,464 which is also incorporated herein by reference. Partially unsaturated monohydroxylated polymers are preferred for use herein in order to allow for the epoxidation to make the epoxidized polymers of this invention.

The crosslinking agents which are useful in the present invention are amine resins. For the purposes of this invention, an amine resin is a resin made by reaction of a material bearing NH groups with a carbonyl compound and an alcohol. The NH bearing material is commonly urea, melamine, benzoguanamine, glycoluril, cyclic ureas, thioureas, guanidines, urethanes, cyanamides, etc. The most common carbonyl component is formaldehyde and other carbonyl compounds include higher aldehydes and ketones. The most commonly used alcohols are methanol, ethanol, and butanol. Other alcohols include propanol, hexanol, etc. American Cyanamid (renamed CYTEC) sells a variety of these amine resins, as do other manufacturers. American Cyanamid's literature describes three classes or "types" of amine resins that they offer for sale.

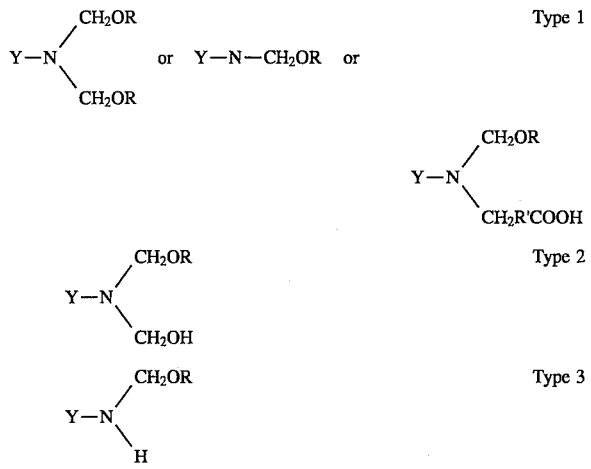

where Y is the material that bore the NH groups, the carbonyl source was formaldehyde and R is the alkyl group from the alcohol used for alkylation. Although this type of description depicts the amino resins as monomeric material of only one pure type, the commercial resins exist as mixtures of monomers, dimers, trimers, etc. and any given resin may have some character of the other types. Dimers, trimers, etc. also contain methylene or ether bridges. Generally, Type 1 amino resins are preferred in the present invention.

The following Type 1 amino resins can be used to achieve the purpose of the present invention: CYMEL® 303—a melamine-formaldehyde resin where R is $CH_3$, CYMEL® 1156—a melamine-formaldehyde resin where R is $C_4H_9$, CYMEL® 1141—a carboxyl modified melamine-formaldehyde resin where R is a mixture of $CH_3$ and i-$C_4H_9$, CYMEL® 1170—a glycoluril-formaldehyde resin where R is $C_4H_9$, and BEETLE® 80—a urea-formaldehyde resin where R is $C_4H_9$. All of these products are made by American Cyanamid Company and are described in its publication 50 *Years of Amino Coating Resins*, edited and written by Albert J. Kirsch, published in 1986 along with other amino resins useful in the present invention.

These amino resins generally have fairly good compatibility with the epoxidized monohydroxylated polydiene polymers. However, the amino resins do not necessarily have to be compatible with the polymer and give phase stable mixtures when merely mixed together because the partial prereaction disclosed in this invention can overcome any incompatibility, giving resins which will not phase separate.

The reinforcing agent is a low molecular weight material having at least two functional groups which will react with the amino resin crosslinker when the composition is heated. Suitable functional groups include primary and secondary alcohols or carboxylic acids. The equivalent weight of the reinforcing agent will usually be between about 30 and about 150 grams per functional group, preferably between about 50 and 100 grams per functional group.

Reinforcing agents suitable for use in the present invention include unsubstituted aliphatic diols such as ethylene glycol, 1,3-propane diol, 1,4-butane diol, and 1,6-hexane diol, substituted aliphatic diols such as 1,2-propane diol, 2-methyl-1,3-propane diol (MP-diol from Arco), neopentyl glycol, 2-ethyl-1,3-hexane diol (PEP-diol), and 2,2,4-trimethyl-1,3-pentane diol, cycloaliphatic diols such as cyclohexane dimethanol, and aromatic diols such as bisphenol A. Triols such as glycerol, trimethylol ethane and trimethylol propane may also be used. Analogous unsubstituted and substituted carboxylic acids may also be used. A preferred material for use herein is 2-ethyl-1,3-hexane diol (PEP diol) because it is a substituted, branched diol and, as such, is not as incompatible with the polydiene polymers as unsubstituted, straight chain diols.

A proton-donating acid catalyst is required to achieve the purposes of the present invention, i.e., crosslink the polymer and reinforcer using the amino resin crosslinkers described above. It is normal that the amount of the acid catalyst used range from about 0.1 to about 4% w of the polymer/ reinforcer/amine resin mixture to be certain there is sufficient acid but an excess can be undesirable. Most preferably, from about 0.5 to about 2% w of the polymer/reinforcer/ amine resin is used. The presence of a strong proton-donating acid is normally required to catalyze the crosslinking reaction of many amino resins which are useful in the present invention. However, some medium strength and even relatively weak acids may also be effective depending upon the amino resins used. Generally, the most active catalysts are those with the lowest pKa values. The following list of acid catalysts which may be used in the present invention is arranged according to increasing pKa value: mineral acids, Cycat® 4040 catalyst (p-toluene sulfonic acid), Cycat® 500 catalyst (dinonylnaphthalene disulfonic acid), Cycat® 600 catalyst (dodecyl benzene sulfonic acid), oxalic acid, maleic acid, hexamic acid, phosphoric acid, Cycat® 296-9 catalyst (dimethyl acid pyrophosphate), phthalic acid and acrylic acid (copolymerized in polymer). Other acids which may be used are described in the aforementioned American Cyanamid Company publication. Also, 3M Brand Resin Catalyst FC-520 (diethylammonium salt of trifluoromethane sulfonic acid) may be used. Cycat® 600 was found to be a very useful catalyst.

The compatible compositions of the present invention are prepared by mixing the polydiene polymer, the amino resin crosslinker, and the reinforcer together. An effort should be made to make the mixture as homogeneous as is reasonably possible. The components are then partially prereacted (incompletely reacted) in an appropriate vessel. It is important that the reaction not proceed too far or the composition will be crosslinked in the vessel before it can be applied as desired, making application very difficult or impossible. But, enough reaction must be accomplished to overcome incompatibility of the components to give a resin which will not phase separate upon standing, or more preferably, is homogeneous and clear. Thus, it is recommended that the reaction take place at 60° to 120° C. for 0.5 to 10 hours in the presence of a small portion of the catalyst needed to entirely crosslink the composition. It is preferred that the amount of catalyst used in the prereaction step not exceed 50% of the total catalyst needed to obtain the desired amount of crosslinking in the final product and it is most preferred that no more than 1.0% by weight be used. The prereacted mixture is then still in a physical form that allows convenient and easy application thereof as desired.

The prereacted mixture and the rest of the catalyst required for crosslinking are then mixed together and applied to a substrate. The substrate is then baked at 100° to 250° C. for 0.01 to 2 hours to effect crosslinking.

Although use of solvent may not be necessary, solvent can be included in with the polymer/reinforcer/amino resin mixture to reduce the viscosity such that the prereacted mixture can be easily stirred during the prereaction or to facilitate application of the finished resin. Suitable solvents include hydrocarbon solvents such as naphtha, mineral spirits, toluene, xylene, etc., and oxygenated solvents such as esters, ketones, ethers and alcohols. A common solvent which is well suited and which was used in much of this work is isobutyl acetate. If the prereacted resin will be dispersed in water for application as a water based product, use of a water soluble solvent, such as BUTYL OXITOL or diacetone alcohol, may be advantageous. Solvent contents of up to 70% w of the polymer/reinforcer/amino resin/solvent mixture can be used. However, it is highly desirable that the solvent content be 40% by weight or less.

For applications in which the resin must have low viscosity but in which solvent content must be low or even zero, it may be necessary to disperse the prereacted resin in water and apply it as a waterborne composition. In this case, the prereaction and subsequent dispersion would need to be done with little or no solvent present. Dispersion of the prereacted resin in water can be accomplished either by the inversion process or by the direct emulsification process. In the inversion process, the surfactant is added to the organic phase which has been heated to a temperature high enough to give the resin a viscosity low enough that it can be efficiently stirred. Typical temperatures are from about 40° to about 90° C. While stirring the resin vigorously, as with a 4-bladed stirrer rotating at about 2000 rpm, water is slowly added. When a volume of water about equal to the volume of the organic phase has been added, the mixture will invert from organic continuous to water continuous, thereby making the waterborne dispersion. More water is then added to reduce the viscosity to the desired range. In the direct emulsification process, surfactant is added to the required amount of water, typically about 150 parts by weight per 100 parts of organic resin. The organic resin is then dispersed in the soapy water with a high shear mixer, such as a Silverson mixer/emulsifier operating at about 6000 rpm. A wide variety of surfactants could be used, including anionic surfactants, nonionic surfactants and cationic surfactants. A particularly effective surfactant used in this work is the anionic surfactant made by neutralizing CYCAT 600 with a tertiary amine such as triethyl amine or dimethylaminoethanol. This compound not only functions as the surfactant to stabilize the dispersion in water but, after the composition is applied to a substrate, the amine evaporates during the bake step, allowing the CYCAT 600 to catalyze the cure with the amino resin.

In the solids portion of the crosslinkable composition, the epoxidized monohydroxylated polydiene polymer should comprise from 30 to 90% by weight (% w) of the polymer/reinforcer/crosslinker composition. The reinforcing agent should comprise from 2 to 40% w of the composition. Thus, the amino resin will comprise from 8 to 60% w of the composition. If the polymer is used at less than 30% w, then the cured composition will be too brittle for most applications. If it is used at more than 90% w, then the concentrations of crosslinker and reinforcer will be too low and the composition will not cure to high strength. If the concentration of the reinforcer is too low, then the cured composition will be too soft for many applications, and if it is too high, then the crosslink density will be too high and the composition will again be too brittle. If the concentration of the amino resin is too low, then the strength will not be as high as desired, and if the concentration is too high, then homopolymerization of the amino resin will cause the cured composition to be too brittle.

The crosslinked materials of the present invention are most useful in coatings, especially in coatings applications which require hard, glossy surfaces such as coatings for metal buildings or furniture or coatings for difficult to bond to substrates such as oily metal or plastic substrates. They are also useful in certain kinds of adhesives (including assembly adhesives, structural adhesives, laminating adhesives and contact adhesives), sealants, films (such as those requiring heat and solvent resistance), etc. However, it may be necessary for a formulator to combine a variety of ingredients together with the polymers of the present invention in order to obtain products having the proper combination of properties (such as adhesion, cohesion, durability, low cost, etc.) for particular applications. Thus, a suitable formulation might contain only the polymers of the present invention, the reinforcing agent and the amino resin curing agent. However, in most adhesive, coating and sealant applications, suitable formulations would also contain various combinations of resins, plasticizers, fillers, solvents, stabilizers and other ingredients such as asphalt. The following are some typical examples of formulating ingredients for adhesives, coatings and sealants.

In adhesive applications, as well as in coatings and sealants, it may be necessary to add an adhesion promoting or tackifying resin that is compatible with the polymer. A common tackifying resin is a diene-olefin copolymer of piperylene and 2-methyl-2-butene having a softening point of about 95° C. This resin is available commercially under the tradename Wingtack® 95 and is prepared by the cationic polymerization of 60% piperylene, 10% isoprene, 5% cyclopentadiene, 15% 2-methyl-2-butene and about 10% dimer, as taught in U.S. Pat. No. 3,577,398. Other tackifying resins may be employed wherein the resinous copolymer comprises 20–80 weight percent of piperylene and 80–20 weight percent of 2-methyl-2-butene. The resins normally have ring and ball softening points as determined by ASTM method E28 between about 80° C. and 115° C.

Aromatic resins may also be employed as tackifying agents, provided that they are compatible with the particular polymer used in the formulation. Normally, these resins should also have ring and ball softening points between about 80° C. and 115° C. although mixtures of aromatic resins having high and low softening points may also be used. Useful resins include coumarone-indene resins, polystyrene resins, vinyl toluene-alpha methylstyrene copolymers and polyindene resins.

Other adhesion promoting resins which are also useful in the compositions of this invention include hydrogenated rosins, esters of rosins, polyterpenes, terpenephenol resins and polymerized mixed olefins, lower softening point resins and liquid resins. An example of a liquid resin is Adtac® LV resin from Hercules. To obtain good thermooxidative and color stability, it is preferred that the tackifying resin be a saturated resin, e.g., a hydrogenated dicyclopentadiene resin such as Escorez® 5000 series resin made by Exxon or a hydrogenated polystyrene or polyalphamethylstyrene resin such as Regalrez® resin made by Hercules. The amount of adhesion promoting resin employed varies from 0 to 400 parts by weight per hundred parts rubber (phr), preferably between 20 to 350 phr, most preferably 20 to 150 phr. The selection of the particular tackifying agent is, in large part, dependent upon the specific polymer employed in the respective adhesive composition.

A composition of the instant invention may contain plasticizers, such as rubber extending plasticizers, or compounding oils or organic or inorganic pigments and dyes. Rubber compounding oils are well-known in the art and include both high saturates content oils and high aromatics content oils. Preferred plasticizers are highly saturated oils, e.g. Tufflo® 6056 and 6204 oil made by Arco and process oils, e.g. Shellflex® 371 oil made by Shell. The amounts of rubber compounding oil employed in the invention composition can vary from 0 to about 500 phr, preferably between about 0 to about 100 phr, and most preferably between about 0 and about 60 phr.

Optional components of the present invention are stabilizers which inhibit or retard heat degradation, oxidation, skin formation and color formation. Stabilizers are typically added to the commercially available compounds in order to protect the polymers against heat degradation and oxidation during the preparation, use and high temperature storage of the composition.

Various types of fillers and pigments can be included in the formulation. This is especially true for exterior coatings or sealants in which fillers are added not only to create the desired appeal but also to improve the performance of the coatings or sealants such as their weatherability. A wide variety of fillers can be used. Suitable fillers include calcium carbonate, clays, talcs, silica, zinc oxide, titanium dioxide and the like. The amount of filler usually is in the range of 0 to about 65% w based on the solvent free portion of the formulation depending on the type of filler used and the application for which the coating or sealant is intended. An especially preferred filler is titanium dioxide.

Additional stabilizers known in the art may also be incorporated into the composition. These may be for protection during the life of the article against, for example, oxygen, ozone and ultra-violet radiation. However, these additional stabilizers should be compatible with the essential stabilizers mentioned hereinabove and their intended function as taught herein.

The only three ingredients that will always be used in all adhesives, coatings or sealants of this invention are the epoxidized monohydroxylated polydiene polymer, the amino resin curing agent, and the reinforcing agent. Beyond these ingredients, the formulator will choose to use or not to use among the various resins, fillers and pigments, plasticizers, reactive oligomers, stabilizers and solvents disclosed herein. No definite rules can be offered about which ingredients will be used. The skilled formulator will choose particular types of ingredients and adjust their concentrations to give exactly the combination of properties needed in the composition for any specific adhesive, coating or sealant application.

Adhesives are frequently thin layers of sticky compositions which are used in protected environments (adhering two substrates together). Therefore, unhydrogenated epoxidized monohydroxylated polymers will usually have adequate stability so resin type and concentration will be selected for maximum stickiness without great concern for stability, and pigments will usually not be used.

Coatings are frequently thin, non-sticky, pigmented compositions applied on a substrate to protect or decorate it. Therefore, hydrogenated epoxidized monohydroxylated polymers may be needed to give adequate durability. Resins will be selected to assure maximum durability and minimum dirt pick-up. Fillers and pigment will be selected carefully to give appropriate durability and color. Coatings will frequently contain relatively high solvent concentration or will be waterborne dispersions to allow easy application and give a smooth dry coating.

Sealants are gap fillers. Therefore, they are used in fairly thick layers to fill the space between two substrates. Since the two substrates frequently move relative to each other, sealants are usually low modulus compositions capable of withstanding this movement. Since sealants are frequently exposed to the weather, the hydrogenated epoxidized monohydroxylated polymers are usually used. Resins and plasticizers will be selected to maintain low modulus and minimize dirt pick-up. Fillers and pigment will be selected to give appropriate durability and color. Since sealants are applied in fairly thick layers, solvent content is as low as possible to minimize shrinkage.

A formulator skilled in the art will see tremendous versatility in the epoxidized monohydroxylated polymer/reinforcer/crosslinker compositions of this invention to prepare adhesives, coatings and sealants having properties suitable for many different applications.

EXAMPLES

The following examples demonstrate the utility of the epoxidized monohydroxylated polymers in amino resin cured compositions. The polymer used in the following examples, Polymer A, was a diblock polymer containing 1.5 meq of epoxy per gram of polymer and having an isoprene block of 2000 weight average molecular weight (MW) and containing most of the epoxy functionality and a 4000 weight average molecular weight (MW) random copolymer block of hydrogenated butadiene and styrene (40% by weight styrene) with the hydroxyl group at the end of the random copolymer block. The amino resin used was CYMEL® 1141, an acid functional, ethylated/butylated melamine resin. The acid used to catalyze the amino resin/ hydroxyl and amino resin/epoxy reactions was CYCAT® 600, dodecyl benzene sulfonic acid (a 70% by weight solution in isopropyl alcohol). The reinforcing agents used include 2-ethyl-1,3-hexane diol (PEP diol), 1,4-butane diol, 2-methyl-1,3-propane diol (MP diol), and bisphenol A. Several different solvents were used including BUTYL OXITOL (ethylene glycol monobutyl ether), diacetone alcohol, and isobutyl acetate.

Coatings made according to the present invention were evaluated for mechanical properties. The appearance (gloss) of the coatings was judged visually. The pencil hardness (gouge) of the coatings was measured according to the ASTM D3363 method of pushing successively softer pencil leads across the coating until the pencil lead will no longer gouge through the coating. The hardness scale (softest to hardest) is 6B<5B<4B<3B<2B<B<HB<F<H<2H<3H<4H<5H<6H.

The methyl ethyl ketone (MEK) resistance of the coatings was measured according to the ASTM D4752 method of rubbing an MEK-moistened cloth across the coating for 200 cycles, or until breakthrough to the metal substrate occurred (one cycle equals one forward and one backward stroke). Adhesion of the coatings was measured with the cross hatch adhesion test, ASTM D3359, Method B. In this test, a lattice pattern is scribed through the coating, pressure sensitive tape is applied and removed, and the amount of coating removed with the tape is rated. The scale ranges from 5 (no adhesion loss) to 0 (greater than 65% adhesion loss). Impact resistance was measured according to ASTM D2794, both direct impact (intrusion) in which the indenter strikes the coated steel substrate on the coated side, and reverse impact (extrusion) in which the indenter strikes the coated substrate from the back side. Impact resistance, in units of in-lb, is determined from the height from which the indenter can be dropped without causing the coating to crack. The higher the number, the more resistant the coating is to destruction by impact. Coating flexibility by the mandrel bend was determined according to ASTM D522, Method A. In this test, the coated steel substrate is bent manually around a conical mandrel. The result is given as the minimum diameter of the mandrel over which the coating can be bent without cracking. The lower the number, the more flexible the coating is.

An integral part of this invention is the process of cooking the components of these compositions to overcome their inherent incompatability. Unless otherwise noted, the polymer, reinforcer and crosslinker were partially reacted by cooking them together in a resin kettle for about 4 hours at 80° C. using about 0.4 pbw (pans by weight) of acid catalyst, CYCAT 600. For convenience, the cooks were typically done at 60% w solids content in solvent, either BUTYL OXITOL or isobutyl acetate, to give the resin a handleable viscosity. Prior to casting films, the acid catalyst content was typically increased to 0.7 pbw in order to accomplish cure during bake. Films were cast on cold rolled steel panels (QD412 Q-Panels) with a #52 wire wound rod and cured by baking 20 minutes at 175° C.

Example 1

Effect Of Reinforcing Diol and Crosslinker Concentration

As shown in Table 1, the formulation without reinforcer (Formulation 1) gives a nice, clear, glossy coating having an H pencil hardness and 2 crosshatch adhesion. Results on the other formulations in Table 1 show that it is indeed possible to achieve clear, glossy coatings with this "cooking" procedure at higher levels of PEP diol and crosslinker. Results show that increasing levels of PEP diol and CYMEL 1141 give harder coatings which have better adhesion. In fact, formulation 6 containing 40/20/40 Polymer A/PEP Diol/ CYMEL 1141 is a very hard coating having excellent adhesion and gloss.

TABLE 1

| Melamine Cure of Polymer A/PEP Diol Mixtures | | | | | | |
|---|---|---|---|---|---|---|
| | 1 | 2 | 3 | 4 | 5 | 6 |
| Composition, pbw | | | | | | |
| Polymer A | 80 | 65 | 65 | 50 | 50 | 40 |
| PEP Diol | | 15 | 10 | 25 | 15 | 20 |
| CYMEL 1141 | 20 | 20 | 25 | 25 | 35 | 40 |
| CYCAT 600 | 0.7 | 0.7 | 0.7 | 0.7 | 0.7 | 0.7 |
| BUTYL OXITOL | 67 | 67 | 67 | 67 | 67 | 67 |
| Properties[1] | | | | | | |
| Thickness, mil | 1.6 | 1.4 | 1.3 | 1.3 | 1.3 | 1.1 |
| Pencil Hardness | H | H | 2H | 4H | 4H | 4H |
| MEK Rubs | >100 | >100 | >100 | >100 | >100 | >100 |
| Crosshatch Adhesion | 2 | 4 | 4 | 3 | 4 | 5 |
| Gloss | High | High | High | High | High | High |

[1]A small amount of dimethyl ethanol amine was added to each sample to prevent discoloration of the steel panels.

Example 2

Comparison of Cooked and Unreacted Blends

Table 2 compares the appearance of solutions and cured coatings of selected formulations from Table 1 using cooked resins compared to solutions which were merely mixed at room temperature and were not cooked. Results on formulation 1 show that cooking may not be required to get good coatings with Polymer A cured with 20% w or less of CYMEL 1141. Results show that formulation 2 gives a phase stable, clear blend when mixed at room temperature but gives a bake coating which has poor gloss. The other three formulations in Table 2 gave phase stable blends when mixed at room temperature, although 3 and 5 were not clear. However, all three formulations mixed at room temperature would not wet the steel panels properly and so gave very poor coatings which, when baked, also had poor gloss. As shown in Table 1, all five coatings made by the cooking procedure gave clear resin solutions and very nice, clear, glossy coatings when baked.

TABLE 2

| Comparison of Unreacted and Partially Reacted Resins | | | | | |
|---|---|---|---|---|---|
| | 1 | 2 | 3 | 4 | 5 |
| Composition, pbw | | | | | |
| Polymer A | 80 | 65 | 50 | 50 | 40 |
| PEP Diol | | 10 | 25 | 15 | 20 |
| CYMEL 1141 | 20 | 25 | 25 | 35 | 40 |
| CYCAT 600 | 0.7 | 0.7 | 0.7 | 0.7 | 0.7 |
| BUTYL OXITOL | 67 | 67 | 67 | 67 | 67 |

TABLE 2-continued

Comparison of Unreacted and Partially Reacted Resins

|  | 1 | 2 | 3 | 4 | 5 |
|---|---|---|---|---|---|
| Appearance of Solutions |  |  |  |  |  |
| Cooked 4 hours @ 80° C. | Clear | Clear | Clear | Clear | Clear |
| Unreacted, mixed @ 25° C. | Clear | Clear | V. Hazy | Clear | Opalescent |
| Appearance of Baked Coatings[1] |  |  |  |  |  |
| From Cooked Resins |  |  |  |  |  |
| Wetting | Good | Good | Good | Good | Good |
| Gloss | Good | Good | Good | Good | Good |
| From Un-reacted Resins |  |  |  |  |  |
| Wetting | Good | Good | Poor | Poor | Poor |
| Gloss | Good | Poor | Poor | Poor | Poor |

[1] A small amount of dimethyl ethanol amine was added to each sample to prevent discoloration of the steel panels.

Example 3

Effect of Solvent Type

BUTYL OXITOL is an undesirable solvent because it is on the EPA Hazardous Air Pollutants list. Comparison of results on formulations 1 and 2 in Table 3 show that isobutyl acetate can be used instead of BUTYL OXITOL. Results on formulation show that the resin can be cooked at 80% w (% by weight) solids if desired.

Results on formulation 4 in Table 3 show the upper limit on crosslink density which can be used. This formulation contains 20% w PEP diol, 60% w CYMEL 1141, and only 20% w Polymer A. Although the resin made by the cooking procedure is clear and compatible, it doesn't wet the steel panel well and, when cured, it gives a brittle coating. Thus, the range of useful coatings will probably contain at least 30% w of the monohydroxylated polydiene polymer.

TABLE 3

Comparison of BUTYL OXITOL and Isobutyl Acetate Solvents

|  | 1 | 2 | 3 | 4 |
|---|---|---|---|---|
| Composition, pbw |  |  |  |  |
| Polymer A | 40 | 40 | 40 | 20 |
| PEP Diol | 20 | 20 | 10 | 20 |
| CYMEL 1141 | 40 | 40 | 50 | 60 |
| CYCAT 600 | 0.7 | 0.7 | 0.7 | 0.7 |
| BUTYL OXITOL | 67 |  |  |  |
| Isobutyl Acetate |  | 67 | 25 | 67 |
| Properties[1] |  |  |  |  |
| Thickness, mil | 1.1 | 1.1 | 1.1 | 1.1 |
| Pencil Hardness | 4H | 4H | 4H | 4H |
| MEK Rubs | >100 | >100 | >100 | >100 |
| Crosshatch Adhesion | 5 | 5 | 5 | 5 |
| Gloss | High | High | High | High[2] |

[1] A small amount of dimethyl ethanol amine was added to each sample to prevent discoloration of the steel panels.
[2] Coating did not wet uniformly. Properties are where coating wet well.

Example 4

Effect of Reinforcing Diol Type

Results in Table 4 compare the effectiveness of four short chain diols for reinforcing Polymer A/CYMEL 1141 coatings. Compared to the 80/20 Polymer A/CYMEL 1141 formulation with no reinforcing diol, all four of the diols are effective in increasing hardness and adhesion. However, 1,4-butane diol is so polar that it gives a hazy resin after cooking and it gives an acceptable but very hazy coating after baking. Bisphenol A gives a clear resin and a nice cured coating. However, it developed an acceptable but undesirable yellow color when the coating was baked. MP-Diol gave an excellent coating although it was somewhat hazy. Nonetheless, MP-Diol is a good candidate for use in these compositions. However, the best diol was the branched PEP diol. It gave a clear resin solution and clear cured coating.

TABLE 4

Melamine Cure of Polymer A With Various Diols

|  | 1 | 2 | 3 | 4 |
|---|---|---|---|---|
| Composition, pbw |  |  |  |  |
| Polymer A | 50 | 50 | 50 | 65 |
| PEP Diol | 15 |  |  |  |
| 1,4-Butane Diol |  | 15 |  |  |
| MP-Diol |  |  | 15 |  |
| Bisphenol A |  |  |  | 15 |
| CYMEL 1141 | 35 | 35 | 35 | 20 |
| CYCAT 600 | 0.4 | 0.4 | 0.4 | 0.4 |
| BUTYL OXITOL | 67 | 67 | 67 | 67 |
| Solution Appearance | Clear | Hazy | Clear | Clear |
| Coating Properties[1] |  |  |  |  |
| Thickness, mil | 1.3 | 1.1 | 1.0 | 1.5 |
| Pencil Hardness | 4H | 4H | 4H | 2H |
| MEK Rubs | >100 | >100 | >100 | 88 |
| Crosshatch Adhesion | 4 | 4 | 4.5 | 4 |
| Gloss | Good | Good | Good | Good |
| Clarity | Clear | V. Hazy | Hazy | Yellow |

[1] A small amount of dimethyl ethanol amine was added to each sample to prevent discoloration of the steel panels.

Example 5

Comparison of Other Polymers

Three other low viscosity hydrocarbon polymers were tested in this work. Polymer B is an epoxidized monohydroxylated polymer which is identical to Polymer A except it contains no polystyrene. Both Polymer A and Polymer B fall within the scope of this invention. Polymer C is similar to Polymer A in that they both contain 40% w styrene. However, Polymer C has about 3 epoxide groups on each end of the molecule and no hydroxyl group. Polymer D is quite different in that it contains no styrene and has no epoxide groups. It is simply a 4000 MW hydrogenated polybutadiene having one hydroxyl on each end. Both Polymer C and Polymer D fall outside the scope of this invention.

Formulations 1 and 3 in Table 5 compare Polymers A and C. Results show they perform quite similarly. They both give clear resin solutions and clear cured coatings. The only difference between them is that Polymer C gives a cured coating having poorer gloss than Polymer A. Formulations 4 and 5 compare Polymer A and Polymer D. Results show that Polymer D is so nonpolar that even cooking the ingredients for 4 hours at 80° C. did not compatibilize the blend which phase separated upon standing.

Formulations 1 and 2 in Table 5 compare Polymer A and Polymer B. Results show that clear resins having excellent properties could be obtained with both polymers. However, because Polymer B contains no styrene, it was more incompatible with the PEP diol and the CYMEL 1141 and so it was necessary to cook Resin 2 for 4 hours at 100° C. to obtain clarity.

TABLE 5

Melamine Cure With Various Polymers

| Composition, pbw | 1 | 2 | 3 | 4 | 5 |
|---|---|---|---|---|---|
| Polymer A | 40 | | | 50 | |
| Polymer B | | 40 | | | |
| Polymer C | | | 40 | | |
| Polymer D | | | | | 50 |
| PEP Diol | 20 | 20 | 20 | 15 | 15 |
| CYMEL 1141 | 40 | 40 | 40 | 35 | 35 |
| CYCAT 600 | 0.4 | 0.4 | 0.4 | 0.4 | 0.4 |
| Isobutyl Acetate | 67 | 100 | 67 | | |
| BUTYL OXITOL | | | | 67 | 67 |
| Solution Appearance | Clear | Clear[2] | Clear | Clear | Separated |
| Coating Properties[1] | | | | | |
| Thickness, mil | 1.0 | 0.9 | 1.1 | 1.3 | — |
| Pencil Hardness | 4H | H | 4H | 4H | |
| MEK Rubs | >100 | >100 | >100 | >100 | |
| Crosshatch Adhesion | 4 | 4 | 4 | 4 | |
| Gloss | Good | Good | Poor | Poor | |
| Clarity | Clear | Clear | Clear | Clear | |

[1] A small amount of dimethyl ethanol amine was added to each sample to prevent discoloration of the steel panels.
[2] It was necessary to cook Resin 2 for 4 hours at 100° C. to obtain clarity.

Example 6

Waterborne Dispersions

Earlier work disclosed in copending, commonly assigned U.S. patent application Ser. No. 262,818, filed Apr. 12, 1994 showed that an 80/20 Polymer D/CYMEL 1141 resin which had been cooked several hours at 80° C. could be dispersed in water using the inversion process and using the amine salt of CYCAT 600 as the surfactant. Results in Table 6 show that it is also possible to make a similar water dispersion using Polymer A reinforced with PEP diol. As shown in Table 6, the 40/20/40 Polymer A/PEP diol/CYMEL 1141 resin mixture was cooked for 4 hours at 80° C. using 0.4 phr of catalyst. 20% w diacetone alcohol (DAA) was used instead of BUTYL OXITOL to control viscosity. Although DAA worked at 80% w solids content, it is a marginal solvent for this composition since the 80% w solids resin is hazy. When the solids content was reduced to 60% w with DAA, the resin precipitated.

After the 80% w solids resin was cooked at 80° C., the dispersion in water was made. The resin was stirred with a double bladed paddle mixer at 2000 rpm and the CYCAT 600 neutralized with dimethyl amino ethanol surfactant was added. Water was then added slowly. After about 100 pbw water had been added, the mix inverted from organic continuous to water continuous. An additional 50 pbw water was added to reduce viscosity. This dispersion was very foamy as it was being made. It is likely that an antifoam would be needed in a practical process. However, an excellent dispersion was obtained. It was a white, opaque, low viscosity dispersion which has remained stable upon storage for at least two months.

The dispersion was coated onto steel panels in preparation for measuring properties. If the dispersion was coated and immediately placed in an oven at 175° C., it cured satisfactorily but the coating surface was somewhat rough, probably due to flashing of the water. Since the appropriate procedure for removing the water will vary with different applications, no study was done to develop a procedure to remove the water. Instead, the dispersion was coated on the steel panels, the water was evaporated in the hood overnight, and the panels were baked the next morning for 20 minutes at 175° C. Results in Table 6 show that the properties of the coating cast from the water dispersion are identical to those found on the coating cast from solvent.

TABLE 6

Waterborne Coating of Polymer A With CYMEL 1141 & PEP Diol

| | pbw | | % w |
|---|---|---|---|
| Resin Composition | | | |
| Polymer A | 40 | | 31.9 |
| PEP Diol | 20 | | 15.9 |
| CYMEL 1141 | 40 | | 31.9 |
| CYCAT 600 | 0.4 | | 0.3 |
| Diacetone Alcohol | 25 | | 19.9 |
| Waterborne Dispersion Composition[1] | | | |
| Polymer A | 40 | | 14.1 |
| PEP Diol | 20 | | 7.0 |
| CYMEL 1141 | 40 | Resin | 14.1 |
| CYCAT 600 | 0.4 | | 0.1 |
| Diacetone Alcohol | 25 | | 8.8 |
| CYCAT 600 | 1.6 | | 0.6 |
| Dimethylaminoethanol | 2.0 | Soap | 0.7 |
| Deionized Water | 5.0 | | 1.8 |
| Deionized Water | 150 | Water | 52.8 |
| Properties[2] | | | |
| Thickness, mil | | 0.9 | |
| Pencil Hardness | | 4H | |
| MEK Rubs | | >100 | |
| Crosshatch Adhesion | | 5 | |
| Gloss | | High | |

[1] Dispersion was made by inversion using a double bladed paddle mixer at 2000 rpm.
[2] Coating was applied to QD412 panels using #52 wire rod, dried overnight to remove water and baked 20 minutes @ 175° C.

Example 7

Cure Conditions

A study was done on the effect of time, temperature and catalyst concentration on the cure of the 40/20/40 Polymer A/PEP Diol/CYMEL 1141 resin formulation. Catalyst concentrations were 0.4 pbw (no extra CYCAT 600 added except that used during the resin cook at 80° C.), 1 pbw and 2 pbw. Results in Table 7 show that the coating can be cured to >100 MEK double rubs with only a 15 minute bake at 135° C., even with only 0.4 pbw of catalyst. At 100° C., at least 60 minutes are required to cure the coating, even at the highest catalyst concentration. The rather long cure time required at 100° C. may be due to the fact that the dimethyl amino ethanol (included in the formulation to prevent discoloration of the steel substrate) must be evaporated before the catalyst can initiate cure of the coating. Results of the crosshatch adhesion test in Table 7 show the very beneficial effect of curing at high temperature and at minimum catalyst concentration.

TABLE 7

Influence of Catalyst Concentration and Bake Conditions

| Composition of Resin Cook | pbw | | |
|---|---|---|---|
| Polymer A | 40 | | |
| PEP Diol | 20 | | |
| CYMEL 1141 | 40 | | |
| CYCAT 600 | 0.4 | | |
| Isobutyl Acetate | 25 | | |

| Composition of Coating Solutions, pbw | 1 | 2 | 3 |
|---|---|---|---|
| Resin Cook | 100 | 100 | 100 |
| Isobutyl Acetate | 33.3 | 33.3 | 33.3 |
| CYCAT 600 | | 0.48 | 1.28 |
| Dimethylaminoethanol | 0.80 | 0.80 | 0.80 |

| Composition of Coating Solids, % w | 1 | 2 | 3 |
|---|---|---|---|
| Polymer A | 40 | 40 | 40 |
| PEP Diol | 20 | 20 | 20 |
| CYMEL 1141 | 40 | 40 | 40 |
| CYCAT 600 | 0.4 | 1 | 2 |

| Coating Cure Conditions | | Cured Coating Properties[1] | | | | | |
|---|---|---|---|---|---|---|---|
| Temp, | Time, | MEK Rubs | | | Crosshatch Adhesion | | |
| °C. | minutes | 1 | 2 | 3 | 1 | 2 | 3 |
| 175 | 15 | >100 | >100 | >100 | 4 | 3 | 2 |
|  | 30 | >100 | >100 | >100 | 4 | 3 | 3 |
| 135 | 15 | >100 | >100 | >100 | 5 | 0 | 0 |
|  | 30 | >100 | >100 | >100 | 5 | 0 | 0 |
|  | 60 | >100 | >100 | >100 | 4 | 2 | 0 |
| 100 | 30 | 24 | 30 | 56 | 5 | 3 | 0 |
|  | 60 | 82 | >100 | >100 | 4 | 0 | 0 |
|  | 90 | 85 | >100 | >100 | 3 | 0 | 0 |
|  | 120 | >100 | >100 | >100 | 5,0 | 0 | 0 |

[1]Coatings were applied on QD412 panels with #52 wire rod. Dry thickness was about 1.1 mil. Pencil hardness of all coatings was 4H.

Example 8

Coating Flexibility

In addition to hardness and adhesion, another important feature of a coating is its flexibility or impact resistance. Table 8 shows results of these flexibility tests on selected formulations. The flexibility tests considered are impact resistance, both direct and reverse, and mandrel bend. Since these properties are known to depend on coating thickness, the coatings were tested at two film thicknesses.

Results show that the most flexible coating is the 80/20 Polymer A/CYMEL 1141 since it has the highest impact resistance and cracks the least in the mandrel bend test. Results show that increasing the crosslink density by including the short chain diol and increasing the melamine concentration not only make the coatings harder but also reduce their flexibility. In fact, all three of the coatings in Table 8 containing only 40% w Polymer A have fairly low impact resistances. Impact resistance on iron phosphated steel (BONDERITE 1000) and on galvanized steel (HDG-60) were about the same as on cold rolled steel (QD412). However, their flexibility is still considered to be good in that they can be bent around a mandrel of about ⅛ inch diameter without cracking.

TABLE 8

Flexibility of Coatings Based on Polymer A/PEP Diol/CYMEL 1141

| | 1 | 2 | 3 | 4 |
|---|---|---|---|---|
| Composition, pbw | | | | |
| Polymer A | 80 | 40 | 40 | 40 |
| PEP Diol | | 20 | 20 | 10 |
| CYMEL 1141 | 20 | 40 | 40 | 50 |
| CYCAT 600 | 0.4 | 0.4 | 0.4 | 0.4 |
| BUTYL OXITOL | 67 | 67 | | |
| Isobutyl Acetate | | | 67 | 67 |
| CYCAT 600 | 0.4 | 0.4 | 0.4 | 0.4 |
| Dimethylaminoethanol | 1.0 | 1.0 | 1.0 | 1.0 |
| Properties coated on QD412 panels with #22 rod | | | | |
| Thickness, mil | 0.5 | 0.4 | 0.5 | 0.4 |
| Impact Resistance | | | | |
| Direct, in-lb | 68 | 52 | 48 | 60 |
| Reverse, in-lb | 60 | 16 | 12 | 16 |
| Mandrel Bend | | | | |
| Crack Length, in | 0 | 0.03 | 0.25 | 0.5 |
| Mandrel Diameter, in | <⅛ | ⅛ | ⅛ | 3/16 |
| Properties coated on QD412 panels with #52 rod | | | | |
| Thickness, mil | 1.3 | 1.0 | 1.1 | 1.0 |
| Impact Resistance | | | | |
| Direct, in-lb | 112 | 56 | 48 | 36 |
| Reverse, in-lb | 108 | 12 | 8 | 12 |
| Mandrel Bend | | | | |
| Crack Length, in | 0 | 0.38 | 0.38 | 0.5 |
| Mandrel Diameter, in | <⅛ | ⅛ | ⅛ | 3/16 |

I claim:

1. A crosslinkable composition comprising from 30 to 90 percent by weight of an epoxidized monohydroxylated polydiene polymer containing from 0.2 to 0.7 meq of epoxy per gram of polymer and having the formula

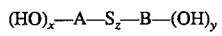

$$(HO)_x-A-S_z-B-(OH)_y$$

wherein A and B are polymer blocks of homopolymer blocks of conjugated diolefin monomers, compolymer blocks of conjugated diolefin monomers, or copolymer blocks of diolefin monomers and monoalkenyl aromatic hydrocarbon monomers, S is a vinyl aromatic block, x and y are 0 or 1 and either x and y must be 1 but only one at a time can be 1, and z is 0 or 1, from 8 to 60 percent by weight of an amino resin crosslinking agent, and from 2 to 40 percent by weight of a reinforcing agent having at least two functional groups reactive with the amino resin selected from the group consisting of primary and secondary alcohols and carboxylic acids.

2. A coating comprising the composition of claim 1.
3. An adhesive comprising the composition of claim 1.
4. A sealant comprising the composition of claim 1.
5. The composition of claim 1 wherein the reinforcing agent is selected from the group consisting of ethylene glycol, 1,3-propane diol, 1,4-butane diol, 1,6-hexane diol, 1,2-propane diol, 2-methyl-1,3-propane diol, 2-ethyl-1,3-hexane diol, 2,2,4 -trimethyl-1,3-pentane diol, 1,4-butane diol, cyclohexane dimethanol, bisphenol A, neopentyl glycol, glycerol, trimethylolethane, and trimethylol propane.
6. A coating comprising the composition of claim 1.

* * * * *

UNITED STATES PATENT AND TRADEMARK OFFICE
CERTIFICATE OF CORRECTION

PATENT NO.   : 5,500,481
DATED        : March 19, 1996
INVENTOR(S)  : David J. St. Clair It is certified that error appears in the above-identified patent and that said Letters Patent is hereby corrected as shown below:

Title page, item [54] and column 1, line 1:

The title should read  -- CROSSLINKABLE COMPOSITIONS CONTAINING EPOXIDIZED MONOHYDROXYLATED DIENE POLYMERS, AMINO RESINS, AND REINFORCEMENT AGENTS, AND A PROCESS FOR PREPARING THEM --.

Claim 1, line 39, delete "0.7" and insert -- 7.0 --.

Claim 1, line 44, delete "compolymer" and insert -- copolymer --.

Signed and Sealed this

Fifth Day of November, 1996

Attest:

BRUCE LEHMAN

*Attesting Officer*        *Commissioner of Patents and Trademarks*